United States Patent [15] 3,705,458
Vassar [45] Dec. 12, 1972

[54] METHOD FOR TESTING WELDED SEAM PIPES IN A TUBE MILL

[72] Inventor: Clyde W. Vassar, Vancouver, Wash.
[73] Assignee: Nelson D. Abbey, Jr., Perrysburg, Ohio
[22] Filed: May 22, 1969
[21] Appl. No.: 826,865

[52] U.S. Cl. ..................29/477.7, 29/480, 29/487, 73/88, 228/15
[51] Int. Cl. ............................................B23k 31/02
[58] Field of Search.....29/477, 477.7, 487, 480, 482; 73/88; 228/15

[56] References Cited

UNITED STATES PATENTS

| | | | |
|---|---|---|---|
| 1,534,133 | 4/1925 | Murray, Jr. | 29/477 X |
| 2,277,473 | 3/1942 | Anderson | 29/477.7 |
| 2,418,312 | 4/1947 | Michelman | 29/477 X |
| 2,977,914 | 4/1961 | Gray et al. | 29/477.7 |
| 2,984,100 | 5/1961 | Reynolds | 73/88 |
| 3,075,484 | 1/1963 | Benteler | 29/480 |
| 3,520,165 | 7/1970 | Dodson | 29/480 X |

Primary Examiner—John F. Campbell
Assistant Examiner—Ronald J. Shore
Attorney—Malcolm W. Fraser

[57] ABSTRACT

The testing of welded seam tubing in a tube mill which commences with an endless metallic strip or ribbon and ends with a welded seam tube cut to a predetermined length after passing through a series of roll passes to form the cylindrical tube, welding the free abutting edges, sizing and shaping the tube and finally recurrently cutting the continuous tube into the desired lengths. After the welding station the tubing is subjected to deformation pressures in order to detect imperfections in the welded seam as well as to the parent metal itself adjacent to the weld, thereby to improve the end product and militate against leaks. Thereafter, the tubing is sized and straightened to its desired shape. Imperfections disclosed by such deformations are determined as the tube travels by accepted methods, such as by ultrasonic testing devices, and thereafter such imperfect areas are either cut out, reworked or discarded as scrap.

1 Claim, 3 Drawing Figures

PATENTED DEC 12 1972

3,705,458

INVENTOR.
CLYDE W. VASSAR
BY
Malcolm W. Fraser
ATTORNEY

METHOD FOR TESTING WELDED SEAM PIPES IN A TUBE MILL

BACKGROUND OF THE INVENTION

Where many miles of welded seam tubing are used for the conveying of hydrocarbons and gas, for example, leaks and ruptures not infrequently occur and this not only results in danger from awesome fires and explosions but also is a tremenduous economic waste and an expensive job imposed on pipe line companies constantly to inspect and, as much as possible, guard against such catastrophies. Efforts are made to cope with these problems by subjecting pipes to tests before being layed in their underground trenches. Deformation tests are employed with selected rings cut from a few random pipe sections and hydraulic tests are required in most instances, but despite these efforts, perhaps due to handling and the installation operations, leaks and ruptures most unexpectedly show up. No continuous deformation device has been employed during the manufacture of the tubing to detect leaks or metal weakness.

SUMMARY OF THE INVENTION

According to this invention, leads and imperfections in welded seam tubing, which up to now have gone undetected during the manufacture of the tubing, are detected and to a large extent, if not entirely, obviating the difficulties above mentioned. Heretofore it often occurs that many tons of tubing have been returned to the manufacturer because of leaks and imperfections, because although factory tests had been carried out on each section of the tubing, field testing shows up leaks and imperfections which cannot be detected with present testing procedures. Thus, in applicant's case, in the tube mill itself, tests are carried on for indicating imperfections and leaks, thereby greatly reducing hazards and providing an efficient procedure for achieving excellent quality tubing.

DESCRIPTION OF PREFERRED EMBODIMENT OF THE INVENTION

Figure 1:
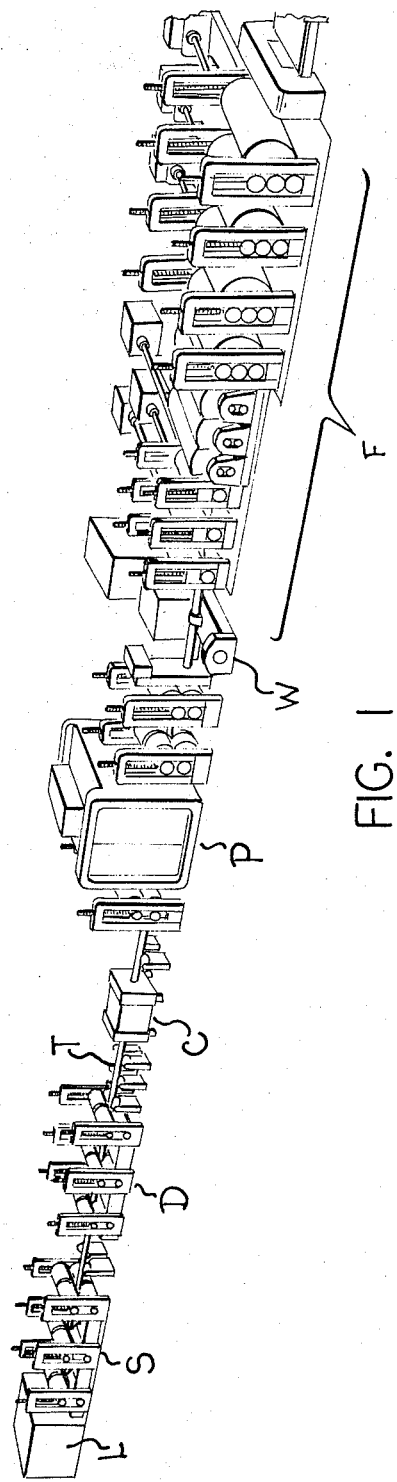
FIG. 1 is a schematic perspective view of a portion of a tube mill for producing welded seam tubing, only that part of the tube mill being illustrated for diagrammatically indicating the tube deformation and test stations and their relation to adjacent stations.

FIG. 1 illustrates the major portion of a tube mill at one end of which an endless metallic ribbon or strip is fed and gradually progresses through the mill until by passing through a series of forming rolls F, the ribbon is formed into a cylindrical tube shape with the free abutting edges at the top and facing each other. After the tube has been formed in such fashion, it is introduced into a welding station W by which the edges of the tube are progressively butt welded by radio frequency electric welding, or some other accepted welding method, to form the completed tube. The tube continuously travels, and from the welding station it passes through, for example, a post heating station P and then through suitable cooling sections C. After the tube leaves the cooling sections, it passes between a series of roll stands S equipped with forming rolls, where the tubing is sized and straightened. The tubing is now completed and then by a traveling rotary cut-off (not shown) it is suitably cut into predetermined lengths. It will be understood that this is a continuous operation and the tubing is mechanically driven from one station to another. Tubing is thus formed rapidly and efficiently and many thousands of feet can be produced in a short period of time. The above description is that of a tube mill well known to those skilled in this art, and detailed description of individual stations through which the tubing passes is not considered necessary. Suffice it to say that opposing pairs of heavy steel rolls are employed in the roll stands for progressively forming the metallic ribbon into tube form and such rolls also are well known and old in the art.

Figure 2:
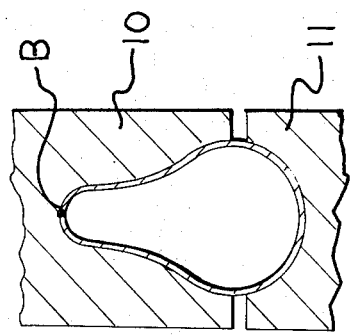
FIG. 2 is a fragmentary sectional view of the tubing and a pair of cooperating forming rolls constituting a portion of those employed for deforming the tubing into a substantially pear-shape, which in effect imposes lateral deformation pressures on the tubing.

In accordance with this invention, a suitable number of roll stands D are interposed preferably just prior to the sizing and straightening secton or station. The rolls of the stands D operate on the tubing as it continuously travels so that there is no interruption in the travel of the tubing as it passes through the entire mill. The rolls of the roll stands D are specially formed and shaped to subject the tubing progressively to deformation pressures. They progressively impose a flattening pressure on the tubing. For example, the tube may be deformed to one-third of its normal vertical or horizontal diameter. The formation of the rolls will be well understood by those skilled in this art, and as indicated in FIG. 2, the final rolls of the roll stands D form the tube into a pear-shape. As there indicated, the tubing T is engaged above and below by rolls 10 and 11, the lower roll 11 maintains the lower portion of the tubing with substantially its original curvature or to that shape prior to being introduced into the roll stands D. On the other hand, the upper roll 10, having a deeper and narrower cavity, serves to squeeze the walls of the tubing toward each other, thus tending to flatten it. It will be observed that the welded seam B is uppermost so that by subjecting the tube to this test, the welded seam of the tubing and the adjacent parent metal are subjected to a severe test. As a consequence, if the welded seam is imperfect, subject to leaks, or otherwise weak, it will become apparent. After the tubing has passed through the roll stands D and is deformed or flattened in this manner, it then passes through the straightening and sizing section, or station S where the tube is brought back to its former cylindrical shape.

Beyond the straightening and sizing section, or station S is a testing device diagrammatically illustrated at L. This may be a visual device well known to those skilled in the art, by which the welded seam B, as well as the adjacent parent metal, can be inspected and checked for leaks, fissures or other imperfections. Devices of this sort are well known on the market and may constitute, for example, ultrasonic inspection equipment or magnetic particle inspection equipment.

In any event, such equipment indicates flaws, defects, imperfections in the welded seam and adjacent areas. It is then incumbent that these areas be appropriately marked so that they can be severed from the tubing and subsequently repaired or, if that cannot be done, scrapped.

Figure 3:
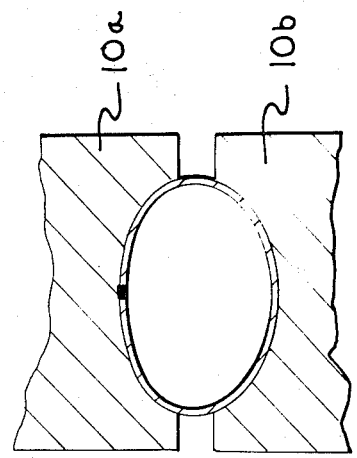
FIG. 3 is a fragmentary sectional view of a tubing and a pair of forming rolls for imposing vertical squeezing pressures on the tubing for flattening or deforming same.

FIG. 3 illustrates another form of tube deformation in which upper and lower rolls 10a and 10b are employed, and these are so shaped as to progressively impose vertical flattening pressures against the tubing T. This achieves the same purpose as the rolls 10 and 11, but subjects the tubing to a somewhat different deformation. If desired, a series of stands may be employed using forming rolls of the order of 10 and 11, as well as a series of forming rolls of the order of 10a and 10b, so that the tubing is subjected both to a lateral squeeze action, as well as a vertical flattening action.

What I claim is:

1. Method of producing welded seam tubing which comprises progressively forming a continuous flat strip of metal as it advances into tubular shape with the free ends facing each other, butt welding the free edges of the strip together during the travel thereof to provide a closed cylindrical shape with an open free interior, progressively subjecting the traveling tubing to squeezing pressures exerted in opposite directions tending to reduce the diameter thereof of the order of one-third of its normal diameter for causing weakened portions in the welded seam and adjacent metal to become apparent while maintaining all areas of the tube in the same relation to the central longitudinal axis thereof, and directly thereafter sizing and shaping the deformed tubing for returning it to its cylindrical shape.

* * * * *